United States Patent [19]

Coutand

[11] Patent Number: 5,506,945
[45] Date of Patent: Apr. 9, 1996

[54] USE OF "PIPES" FOR THE TRANSFER OF STATUS INFORMATION BETWEEN DIFFERENT REMOTE SYSTEMS

[75] Inventor: Bernard Coutand, St Hilaire De Clisson, France

[73] Assignee: Bull S.A., Puteaux, France

[21] Appl. No.: 127,780

[22] Filed: Sep. 27, 1993

[30] Foreign Application Priority Data

Sep. 30, 1992 [FR] France ................................. 92 11621

[51] Int. Cl.$^6$ .................................................. G06K 15/00
[52] U.S. Cl. ............................ 395/114; 395/115; 395/113
[58] Field of Search ................................. 395/114, 115, 395/112, 200, 113; 364/948.34, 260.3

[56] References Cited

U.S. PATENT DOCUMENTS

| | | | |
|---|---|---|---|
| 4,695,946 | 9/1987 | Andreasen et al. | 395/575 |
| 5,303,344 | 4/1994 | Yokoyama et al. | 395/200 |
| 5,313,594 | 5/1994 | Wakerly | 395/325 |
| 5,323,393 | 6/1994 | Barrett et al. | 370/85.8 |
| 5,369,749 | 11/1994 | Baker et al. | 395/325 |
| 5,375,207 | 12/1994 | Blakely et al. | 395/200 |
| 5,392,401 | 2/1995 | Barucchi et al. | 395/200 |
| 5,394,526 | 2/1995 | Crouse et al. | 395/200 |

FOREIGN PATENT DOCUMENTS

| | | |
|---|---|---|
| 2201272 | 8/1988 | United Kingdom . |
| WO8301851 | 5/1983 | WIPO . |

OTHER PUBLICATIONS

IBM Technical Disclosure Bulletin, vol. 34, No. 4B, Sep. 1991, New York, "Named Pipes Make Operating System/2 Extended Edition Multi–User", pp. 387–388.

"Hardware–und Software–Maschinen", Elektronik, vol. 34, No. 9, May, 1985, pp. 83–88.

"The Design of the Unix Operating System", M. J. Bach, 1986, Prentice/Hall, London, pp. 112–117.

*Primary Examiner*—Mark R. Powell
*Assistant Examiner*—Tracy M. Legree
*Attorney, Agent, or Firm*—Weingarten, Schurgin, Gagnebin & Hayes

[57] ABSTRACT

The files containing status information from remote systems (RS) of a network are transferred automatically to a local system (LS) controlling a printer thanks to this procedure. To do this, with the printer connected to the network, associated with each file transfer two synchronization files or "pipes" are used, the first (P1) in the direction local system to remote system and the second (P2) in the direction remote system to local system. Thus, an automaton for retrieving status reports is created for the purpose of printing them on the printer of the local system. These synchronization files principally provide the synchronization and communication between a scan and command process (SCP) of the remote system which is initiated on the local system and a file transfer process (FTP) which returns the status reports to be printed from the remote system to the local system.

18 Claims, 2 Drawing Sheets

USE OF "PIPES" FOR THE TRANSFER OF STATUS INFORMATION BETWEEN DIFFERENT REMOTE SYSTEMS

FIELD OF THE INVENTION

This invention involves a procedure for the transfer to a local system which controls a printer of a number of files containing the status information from a number of remote systems in a network for printing said status information on the printer of the local system.

BACKGROUND OF THE INVENTION

When various systems separated from each other are connected on a network and communicate with each other, generally only the local system, for cost reasons, may be equipped with a sophisticated non-impact printing system. Under these conditions and until now, when one wished to perform transfers of status information, of the type known as SYSOUT (SYSOUT being printable files), from remote systems to the local system, said transfers are performed manually, that is, an operator must initiate a file transfer command. In addition, if the local system is equipped with a sophisticated non-impact printing system, this system only permits printing of the status information from said local system; thus the status information from "off-line" remote systems, that is, systems not connected to the local system, may not be directly printed. An operator must then mount on the local system magnetic tapes containing the status information from the remote systems, which is totally anachronistic in such a sophisticated environment, and presents serious disadvantages by preventing the automation of the procedure.

SUMMARY OF THE INVENTION

The purpose of this invention is to correct these various disadvantages and the invention proposes a procedure which simply and efficiently allows total automation of the operation.

To do this, the procedure cited in the introduction is remarkable in that, when the printer is connected to a telecommunications network, associated with each file transfer from a remote system are two synchronization files of the type known as "tube", the first one in the direction local system to remote system, and the second in the direction remote system to local system, thus creating an automatic retrieval of multiple reports which principally ensures synchronization and communication between, first, a scan and command process initiated on the local system and responsible for monitoring the associated remote system and for sending to this system the command for the status information to be transmitted and, second, a file transfer process responsible for sending the status information to be printed from the remote system to the local system.

Thus, the idea of the invention consists primarily of using for the first time synchronization files or "pipes" for the transfer of status information from a number of remote systems to a local system. The invention offers in this way a solution to a technical problem that the engineer has been trying to solve for a long time and, in addition, allows satisfying the needs for automation of the processing (where certain operations were performed manually) and a reduction in the costs (elimination of operators) which also existed. The synchronization file or "tube" is a sequential file which is described under the name "conduit" in the work of M. J. ROCHKIND published by MASSON under the title "UNIX programmation avancée" [Advanced UNIX programming]. It is, in fact, a pseudo-file which has been modified to provide synchronization between a transmitter (writer) and a receiver (reader) and stand-by by offering a convenient way of organizing and distributing tasks. An automaton is thus created by associating with a file transfer which depends on an application already existing on various systems a synchronization file at input and a second file at output. The two principal processes of scan and command on the one hand, and transfer on the other, are linked by these synchronization files and can thus communicate. A file transfer which is not associated with synchronization files may not be used simply to dialogue with a task (necessity of modifying the file transfer, placing semaphores, etc.), whereas it is directly useable and automated by applying the idea of the invention. One or more tasks write in the synchronization file, and the others read it. If the file is empty but open for writing, readings are suspended until the data (items) are available. The data reading of the synchronization file is followed implicitly by the elimination of these data. When the file is coded, and is no longer open to writing, any attempt to read causes the display of a code "end of file". Automation of the editing and the security of the transfer are thus assured.

BRIEF DESCRIPTION OF THE DRAWINGS

The following description with respect to the attached drawings, which are given as an example, without limitation, shall show how the invention may be achieved.

DETAILED DESCRIPTION OF A PREFERRED EMBODIMENT

Figure 1:
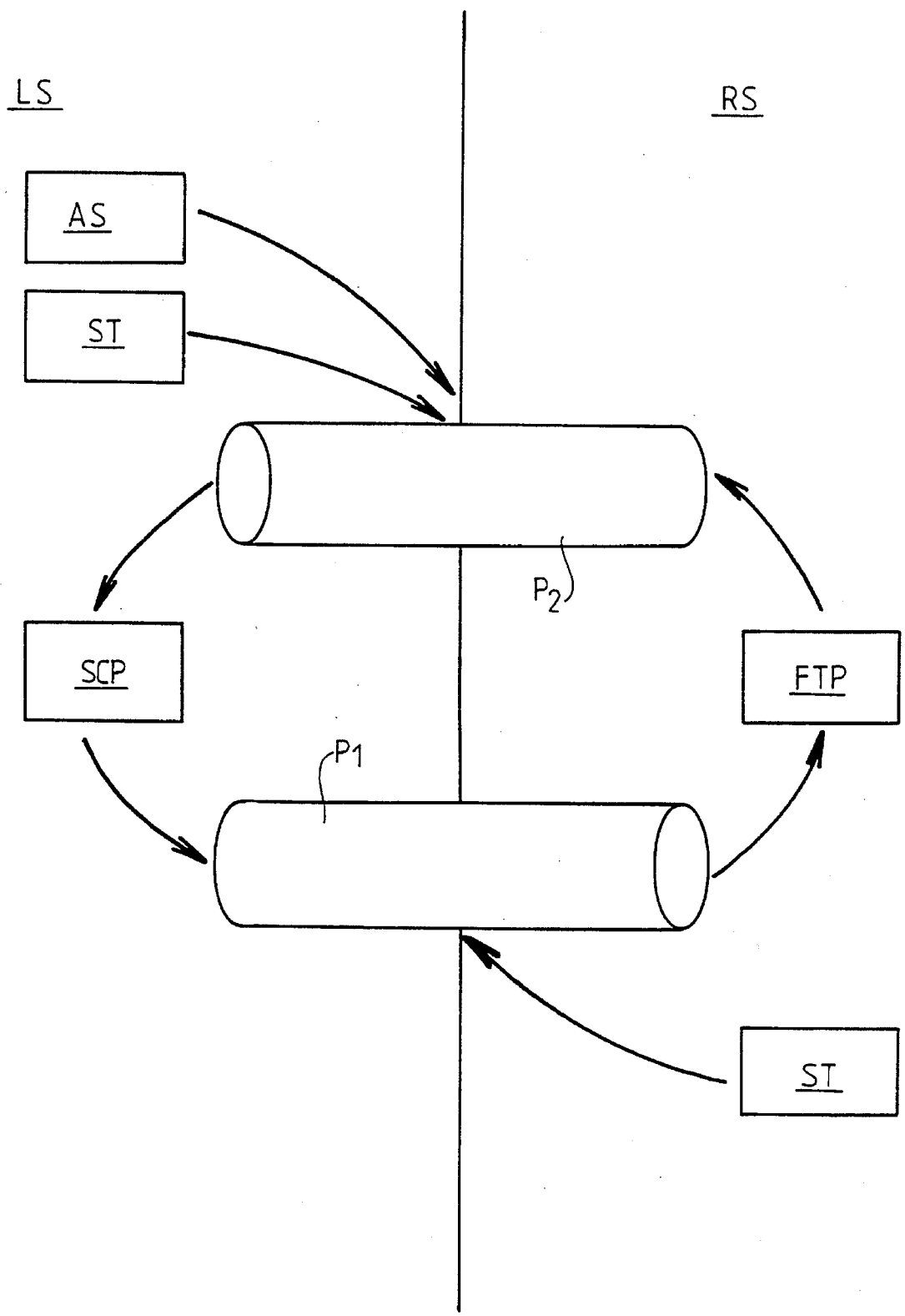
FIG. 1 shows a synoptic diagram of the operation as automaton obtained by the procedure according to the invention.

The synoptic diagram of FIG. 1 illustrates the following general principle which concerns communication between processes. The local system LS initiates the monitoring which will allow analysis of each of the different remote systems RS containing the names of the printable files or SYSOUT in order to retrieve said printable files. To transpose this set of systems to the level of client/server systems, it will suffice in the following to consider the local system as the server and the remote systems as the clients. The local system controls a printer and is thus responsible for monitoring a number of other remote systems which may have to proceed to printing on this printer.

According to the idea of the invention, the procedure of transfer to the local system LS controlling a printer of a number of files containing the status information from a number of remote systems RS of a network N (see FIG. 2) for printing of said status information on the local system's printer is remarkable in that, with the printer connected to a telecommunications network, associated with each file transfer from a remote system RS are two synchronization files $P_1$, $P_2$ of the type known as "pipes"; the first $P_1$ in the direction local system to remote system, and the second $P_2$ in the direction remote system to local system thus creating an automaton for retrieval of multiple editions, which ensure principally the synchronization and communication between a scan and command process SCP initiated on the local system LS and responsible for monitoring the remote system RS and for sending it the command of the status information to be transmitted and a file transfer process FTP responsible for returning the status information to be printed from the remote system RS to the local system LS.

Thus, associated with each remote system RS is a monitoring task performed by means of a scan and command process initiated on the local system which, in addition, commands the name of the status information to be transmitted and, in response to this command, a file transfer process FTP allows the remote system to return the status information to be edited to the local system. Thus, to every monitoring corresponds a group of tasks participating in the "multi-task" activity of the local system and, although the number of monitors is theoretically unlimited, it is reasonable to plan on a limitation for this number because, the normal activity of the central processor in the local system cannot maintain itself beyond a certain degree of multiprogramming, and performance decreases significantly. To avoid this deterioration in performance, the number of monitors may, for example, be limited to eight.

Figure 2:
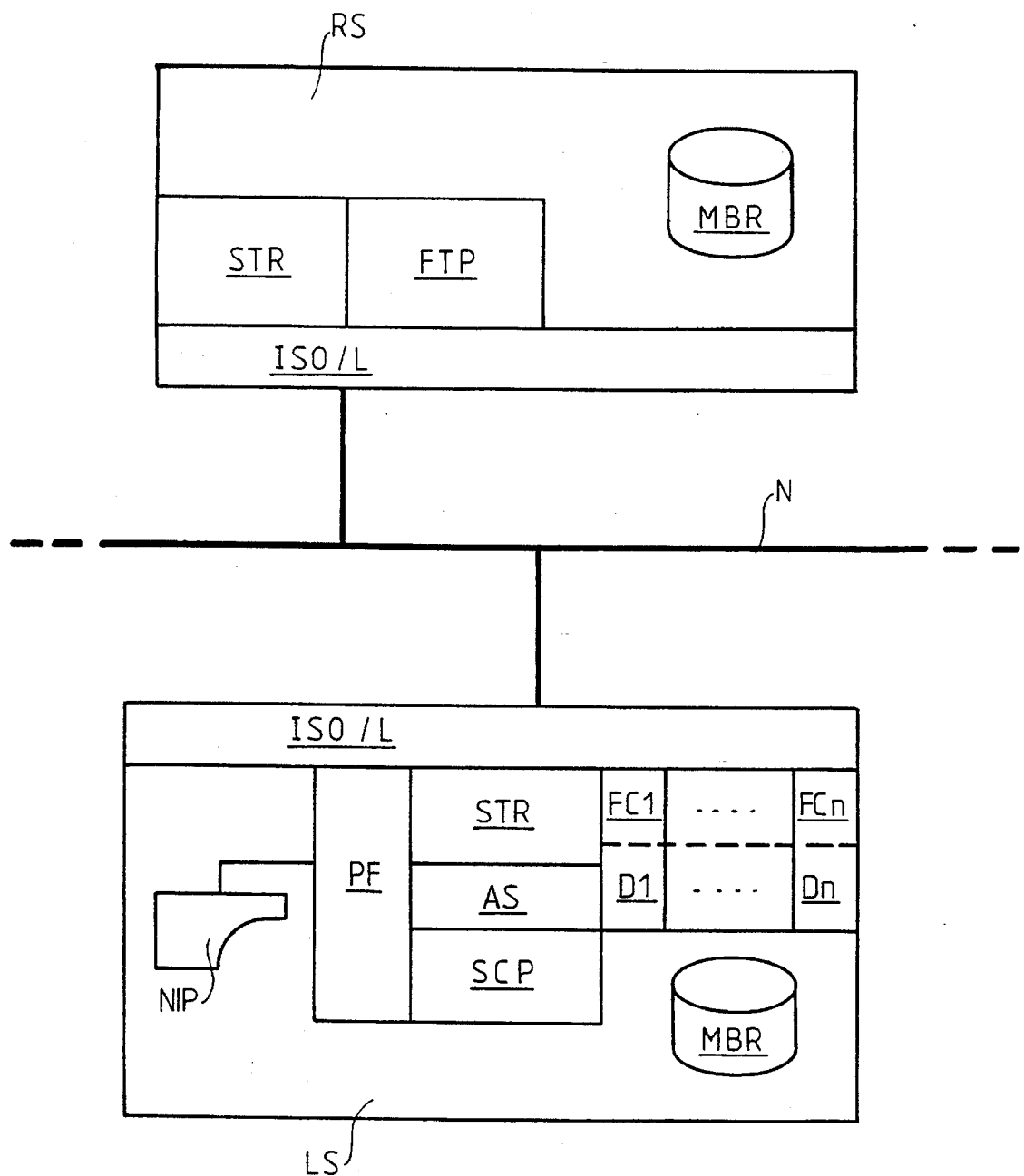
FIG. 2 shows an example of linking between systems using the procedure according to the invention.

More specifically described with the help of FIG. 2, the procedure of the invention is organized around the SCP process whose principal task is to manage the file transfers by means of an STR application already existing in the various systems and dedicated to the transfer of the status information to be retrieved. When a print command is given on the remote system RS, the name of the status report and its print parameters are stored in a station. Here, the actual representation of the notion of station on the remote system is the mail box MBR. When monitoring is initiated, a scan of the station or stations assigned to it is performed. If the MBR station is empty, the monitoring waits; if it is not empty, the SCP process requests the retrieval of the status information of the assigned station. On the remote system RS, the FTP process is responsible for looking in the mail box MBR for status information waiting to be printed and for sending the name of the status report as well as its physical location. The status information retrieved to the local system LS is then stored under the directory $D_i$ of the storage disk, i varying from 1 to 8 (if the monitor limit is set at eight) depending on the retrieval number and the editing of these same status reports is automatically initiated during the application of the procedure of the invention. On the local system, the three most important tasks used according to this procedure are 1) the SCP task, the principal task which, through two files $P_1$ and $P_2$, manages the commands and the messages of the STR task; 2) the STR task dedicated to the transfer of the status information to be retrieved, and 3) an AS task particular to the monitoring of the automaton created.

In addition, the user may customize the final processing of the retrieved status report by modifying the appropriate file PF which can thus be intended for use either with a non-impact printing system NIP as shown on the figure, or with a conventional printing system, or even with a storage peripheral, with the print order depending on the print system chosen.

The scanning of the stations may be performed in series or in parallel. Thus, if a parallel scan is performed the stations are examined in parallel and a group of tasks will correspond to one monitoring. In contrast, during a series scan, a single group of tasks examines several stations. The monitoring of these stations includes a certain number of parameters common to the stations, start and end time of the scan, even the name of the remote system, etc. In this procedure, a parallel scan will be used in preference.

As seen earlier, a logic station of a system corresponds to a physical notion of the system which is the mail box. This notion of station represents a resource of the system and allows the storage of the different status reports to be printed. The printing may be performed locally by a mail box like MBR. To modify the mail box dedicated to printing, which is most commonly called a print queue, all that is necessary is to conform to the syntax of the print command (generally, the print command specific to a traditional print system) to move the storage of the status information to a new print queue.

Such a file transfer procedure thus offers various advantages, the first of which relates to the security of the transfer. In effect, said procedure uses on the local system, for the file transfers, the STR application already existing on the various systems. This STR application controls a first error level, it allows obtaining a file identical to that of the remote system through ISO layers marked ISO/L on the drawing. During a file transfer, if the STR application is interrupted following a network problem, the current transfer shall be entirely restarted later; this type of error is managed advantageously according to this procedure. In addition, if the system interrupts the group of tasks of a process, or if the group of tasks is interrupted on its own, the current transfer shall be automatically restarted at the re-initiation of the procedure. Other advantages also appear with respect to simultaneity of the retrieval and transparency with respect to use by different printers. Another, very significant advantage comes from the fact that, with the use of such an automaton, the number of operations is significantly reduced, thus producing a gain in time, a reduction of the cost and an increase in performance.

According to a preferred application, the procedure of the invention is remarkable in that, in addition, associated with each scan is a scan configuration file containing principally the parameters for the name of the local system, the name of the remote system scanned, the name of the station or mail box scanned, the time scanning starts, the name of the status information retrieval disk and the status parameters to be retrieved.

Thus, scan configuration files $FC_i$ (i varying between 1 and 8 in this example) are generated or updated during the installation, that is, during the configuration of the different scans, so that each contains the various parameters concerning a scan and, thus, a given monitoring. There exists, therefore, a scan configuration file by monitoring, and this file is located under the directory $FC_i$ of the storage disk of the local system.

Therefore, corresponding to each scan are two directories on the storage disk: the first, $FC_i$, which contains the file particular to this scan, and a second $D_i$, whose localization is indicated under the directory $FC_i$ and which contains the retrieved status information. Conversely, to clear a scan, all that is necessary is to empty its associated directories $FC_i$ and $D_i$.

It should be noted that a mail box in which the status information is going to be stored must not be just any box. In effect, the local printing already uses a certain number of mail boxes and it is necessary, therefore, to verify its existence.

In summary, to perform the transfers of status information through the networks, the local system and the remote systems dialogue by exchanging messages. The communications between a remote system and the local system are done advantageously, as has been previously described, according to this procedure, thanks to the synchronization files or "pipes" $P_1$ and $P_2$. These files or "pipes", through the specific application STR, allow the tasks to have direct access to the data reserved for them. To authorize such a dialogue, the procedure of the invention principally uses two tasks executed respectively following the SCP and FTP processes. The SCP process queries the FTP process to obtain the names of the status reports to be transferred to the local system for printing. The SCP process is, in fact, the initiator, for it is this process which determines the sending of the message containing a request for status name. This request contains a certain number of data which indicate, in addition, the name of the mail box in which the names of the desired status reports are located. The FTP process, in response to this request, is going to examine the mail box. If this box is empty, a specific message is sent; if the box is not empty, the name of the status report with its location on the remote system and print parameters are sent to the local system to be used by the SCP process. This process then has all the data necessary to perform the retrieval of the waiting status report, and this transfer is also achieved with the STR application already existing in the various systems. The retrieved status information is stored on the receiving disk of the local system under the correct directory Di and, at the end of transfer, a print command is initiated by the file PF through which the print system intended for the printing is selected.

The scan and command process acts, in fact, like an automaton which receives the data through the synchronization file, analyses it, then executes the appropriate processing.

Specifically, the scan and command process begins by reading the appropriate scan configuration file FCi to obtain the data necessary for the scan, including, among other items, the name of the remote system RS to be monitored and the name of the mail box MBR in which the desired status report is stored; then it enters a first loop, communicates to the remote system through the first synchronization file P1 in which it writes the data for the request of the status information name, and initiates the command for the known specific application STR for the transmission of the data. It then waits in queue for the reading of a response from the remote system through the second synchronization file P2, and enters a second loop which allows reading the messages received in response. If the response includes the message "mail box empty", it continues to wait for a predetermined time, for example several seconds, then resends the request. If, on the other hand, the answer includes the name of the status report to be retrieved, a transfer request is issued through the first synchronization file P1 by means of the known specific application STR. The status report which is then retrieved is stored in an appropriate directory Di while a print command is initiated.

Also characteristically, the file transfer process, in a preliminary phase, will wait for a message coming from the local system LS through the first synchronization file P1, then it enters a loop when it detects the arrival of the message and reads the data containing, among other items, the name of the mail box MBR in which the status report to be retrieved is to be stored, and the name of the local system LS waiting for the status report to be retrieved. It is then going to read in the designated mail box if the desire status report is stored there and, with the known specific application STR, it may then issue two types of responses to the local system through the second synchronization file P2. If the mail box is empty, an error code is provided and, in this case, it sends the local system a message of the type "mail box empty"; if it is not empty, it receives the data pertaining to the name of the status report desired with its exact location and the print parameters and, in this case, it sends the local system this data for the status report to be retrieved.

In addition, and as shown on FIG. 1, the procedure according to the invention uses to advantage a stop process ST, thus allowing the interruption of one or more scans. According to the ST process, a stop message written in the synchronization file of a specific scan allows the interruption of said scan in progress. This ST process, called several times with a different parameter, a parameter corresponding to a scan number, authorizes the interruption of the desired number of scans. FIG. 1 shows that the ST process may be applied to be executed locally in the synchronization files P1 and P2.

Also shown on FIG. 1 in a remarkable way, the AS process for monitoring the automaton thus created is provided to unblock the local system in the event of a network problem. At the beginning of a predetermined space of time, for example each minute throughout the application of the procedure, the AS process is responsible for issuing locally a specific message written in the second synchronization file P2. The scan and command process SCP receives and analyzes this specific message and counts the number of times it appears successively. If the network is blocked, the SCP process no longer receives anything but these specific messages, since it can no longer communicate with the file transfer process FTP. When this message is received successively a certain preset number of times without other data, at the end of six minutes for example, thus six successive appearances without communication, the network is considered blocked and the SCP process is interrupted.

To conclude, the file transfer procedure between remote systems as described and claimed is directly useable and automated because of the use for the first time of synchronization files for this type of transfer. An automaton is thus simply created, advantageously and efficiently, by associating with a file transfer which depends on an application already existing on the various systems a synchronization file during input and a second at output to link a scan and command process to a file transfer process. These two processes may thus communicate easily. Moreover, thanks to this procedure, the security of the transfers is guaranteed. In addition, various other advantages appear with respect to simultaneity of the retrieval of the files and transparency of use by different printers. In addition, the user may customize the final processing of the retrieved status report by selecting the print system desired. In addition, with the use of such an automaton, the number of operations is very significantly reduced, thus creating a significant gain in time and reduction in costs, as well as a notable increase in performance.

What is claimed is:

1. A Transfer procedure, to a local system controlling a printer, of a number of files forming reports containing status information from a number of remote systems of a network for printing said status information on the printer of the local system, wherein associated with each file transfer from a remote system are two synchronization files of the type known as "pipes", the first pipe in a direction local system to remote system, and the second pipe in a direction remote system to local system, said synchronization files creating an automaton for retrieval of multiple reports providing primarily synchronization and communication between:

a scan and command process initiated on the local system, the scan and command process monitoring the associated remote system and sending the remote system a command for the report to be transmitted, and a file transfer process by which the status information to be printed is sent from the remote system to the local system.

2. A file transfer procedure according to claim 1, wherein associated with each scan is a scan configuration file comprising:

parameters for a name of the local system, a name of the remote system scanned, a name of a mail box scanned, a time the scan begins, a name of a status retrieval disk, and parameters of the reports to be retrieved.

3. A file transfer procedure according to claim 2, wherein the synchronization files are communicating different messages by means of a specific application, the file transfer procedure further comprising:

a first step wherein the scan and command process queries the file transfer process to obtain the names of the reports to be transferred to the local system for printing and sends a message containing a request for the report name, said request containing data which allows obtaining the name of the mail box of the remote system whereby the name of the desired report is found;

a second step wherein the file transfer process, in response to the request, examines said mail box in order to send, if the mail box is empty, a specific message to the local system and, if the mail box is not empty, to send to the local system the data relating to the name of the report with the report's situation on the remote system, and print parameters, said print parameters comprising data which is then used by the scan and command process, a third step, wherein the scan and command process performs the retrieval of the waiting report, the retrieved report is then stored on a receiving disk of the local system under a directory intended for the local system, and, a fourth step wherein a print command is initiated for the printing of the report on the desired printer of the local system.

4. A file transfer procedure according to claim 3, wherein the scan and command process begins by reading the appropriate scan configuration file to learn the data necessary for the scan, the data includes the name of the remote system to be monitored and the name of the mail box in which the desired report is stored, the scan and command process then enters a first loop, wherein the scan and command process:

communicates with the remote system through the first synchronization file in which the scan and command process writes the data for the request of the report name, initiates the command for the specific application for the transmission of the data, waits to read a response from the remote system, through the second synchronization file, and enters a second loop, if the response includes a message "mail box empty", the scan and command process:

waits a predetermined time then resends a request, or if the answer includes the name of the report to be retrieved requests transfer of the name of the report through the first synchronization file by means of the specific application, retrieves this report which is stored in an appropriate directory, and initiates a print command.

5. A file transfer procedure according to claim 4, wherein the file transfer process in a preliminary monitoring phase:

waits for a message coming from the local system through the first synchronization file, enters a loop when it detects the arrival of the message, and reads the information containing, among other items, the name of the mail box in which the report to be retrieved must be stored and the name of the local system waiting for the report to be retrieved, the file transfer process then reads in the appropriate mail box if the desired report is stored there, and issues a response by means of the specific application through the second synchronization file, if the mail box is empty an error code is provided and the file transfer process sends the local system a message "mail box empty" and, if the mail box is not empty, after receiving the data pertaining to the name of the desired report with the report's exact location and print parameters, the file transfer process sends the local system said data concerning the report to be retrieved.

6. A file transfer procedure according to claim 5, wherein the file transfer procedure further comprises:

a stop process used locally to interrupt one or more scans, and a stop message being written in the synchronization file of a specific scan for each of the scans to be interrupted.

7. A file transfer procedure according to claim 6, wherein the file transfer procedure further comprises:

a process for monitoring the automaton and for unblocking the local system in the event of a network problem; the process issuing locally, at each predetermined interval throughout the application of the procedure, a specific message stored in the synchronization file, the scan and command process receives said specific message, analyzes said specific message, and counts the number of times said specific message appears successively, the scan and command process detecting a network block, and the scan and command process is then automatically interrupted when only said message without other data is received a predetermined successive number of times.

8. A file transfer procedure according to claim 1, wherein the synchronization files are communicating different messages by means of a specific application, the file transfer procedure further comprising:

a first step wherein the scan and command process queries the file transfer process to obtain the names of the reports to be transferred to the local system for printing and sends a message containing a request for the report name, said request containing data which allows obtaining the name of the mail box of the remote system whereby the name of the desired report is found;

a second step wherein the file transfer process, in response to the request, examines said mail box in order to send, if the mail box is empty, a specific message to the local system and, if the mail box is not empty, to send to the local system the data relating to the name of the report with the report's situation on the remote system, and print parameters, said print parameters comprising data which is then used by the scan and command process, a third step, wherein the scan and command process performs the retrieval of the waiting report, the retrieved report is then stored on a receiving disk of the local system under a directory intended for the local system, and, a fourth step wherein a print command is initiated for the printing of the report on the desired printer of the local system.

9. A file transfer procedure according to claim 8, wherein the scan and command process begins by reading the appropriate scan configuration file to learn the data necessary for the scan, the data includes the name of the remote system to be monitored and the name of the mail box in which the desired report is stored, the scan and command process then enters a first loop, wherein the scan and command process:

- communicates with the remote system through the first synchronization file in which the scan and command process writes the data for the request of the report name,
- initiates the command for the specific application for the transmission of the data,
- waits to read a response from the remote system, through the second synchronization file, and
- enters a second loop, if the response includes a message "mail box empty", the scan and command process:
- waits a predetermined time than resends a request, or if the answer includes the name of the report to be retrieved requests transfer of the name of the report through the first synchronization file by means of the specific application,
- retrieves this report which is stored in an appropriate directory, and
- initiates a print command.

10. A file transfer procedure according to claim 9, wherein the file transfer process in a preliminary monitoring phase:

- waits for a message coming from the local system through the first synchronization file,
- enters a loop when it detects the arrival of the message, and
- reads the information containing, among other items, the name of the mail box in which the report to be retrieved must be stored and the name of the local system waiting for the report to be retrieved, the file transfer process then reads in the appropriate mail box if the desired report is stored there, and issues a response by means of the specific application through the second synchronization file,
- if the mail box is empty an error code is provided and the file transfer process sends the local system a message "mail box empty" and,
- if the mail box is not empty, after receiving the data pertaining to the name of the desired report with the report's exact location and print parameters, the file transfer process sends the local system said data concerning the report to be retrieved.

11. A file transfer procedure according to claim 10, wherein the file transfer procedure further comprises:

- a stop process used locally to interrupt one or more scans, and
- a stop message being written in the synchronization file of a specific scan for each of the scans to be interrupted.

12. A file transfer procedure according to claim 11, wherein the file transfer procedure further comprises:

- a process for monitoring the automaton and for unblocking the local system in the event of a network problem; the process issuing locally, at each predetermined interval throughout the application of the procedure, a specific message stored in the synchronization file, the scan and command process receives said specific message, analyzes said specific message, and counts the number of times said specific message appears successively, the scan and command process detecting a network block, and the scan and command process is then automatically interrupted when only said message without other data is received a predetermined successive number of times.

13. A file transfer procedure, to a local system controlling a printer, of a number of files forming reports containing status information from a number of remote systems of a network for printing of said status information on the printer of the local system, wherein associated with each file transfer from a remote system are two synchronization files of the type known as "pipes", the first pipe in a direction from the local system to one of the remote systems, and the second pipe in a direction from one of the remote systems to the local system, said synchronization files creating an automaton for retrieval of multiple reports providing primarily synchronization and communication between: a scan and command process initiated on the local system, the scan and command process monitoring the associated remote system and sending the remote system a command for the report to be transmitted, and a file transfer process by which the status information to be printed is sent from the remote system to the local system, wherein said file transfer procedure comprises the steps of:

- the scan and command process querying the file transfer process to obtain the names of the reports to be transferred to the local system for printing and sends a message containing a request for a report name, said request containing data which allows obtaining the name of the mail box of the remote system whereby the name of the desired report is found;
- the file transfer process, in response to the request, examining said mail box in order to send, if the mail box is empty, a specific message to the local system and, if the mail box is not empty, to send to the local system the data relating to the name of the report with the report's situation on the remote system, and print parameters, said print parameters comprising data which is then used by the scan and command process;
- the scan and command process performing the retrieval of the waiting report, then storing the retrieved report on a receiving disk of the local system under a directory intended for the local system; and
- initiating a print command for the printing of the report on the desired printer of the local system.

14. A file transfer procedure according to claim 13, wherein associated with each scan is a scan configuration file comprising:

- parameters for a name of the local system,
- a name of the remote system scanned,
- a name of a mail box scanned,
- a time the scan begins,
- a name of a status retrieval disk, and
- parameters of the reports to be retrieved.

15. A file transfer procedure according to claim 14, wherein the scan and command process begins by reading the appropriate scan configuration file to learn the data necessary for the scan, the data includes the name of the remote system to be monitored and the name of the mail box in which the desired report is stored, the scan and command process then enters a first loop, wherein the scan and command process:

communicates with the remote system through the first synchronization file in which the scan and command process writes the data for the request of the report name, initiates the command for the specific application for the transmission of the data, waits to read a response from the remote system, through the second synchronization file, and enters a second loop, if the response includes a message "mail box empty", wherein the scan and command process:

waits a predetermined time than resends a request, or if the answer includes the name of the report to be retrieved requests transfer of the name of the report through the first synchronization file by means of the specific application, retrieves this report which is stored in an appropriate directory, and initiates a print command.

16. A file transfer procedure according to claim 15, wherein the file transfer process in a preliminary monitoring phase:

waits for a message coming from the local system through the first synchronization file, enters a loop when it detects the arrival of the message, and reads the information containing, among other items, the name of the mail box in which the report to be retrieved must be stored and the name of the local system waiting for the report to be retrieved, the file transfer process then reads in the appropriate mail box if the desired report is stored there, and issues a response by means of the specific application through the second synchronization file, if the mail box is empty an error code is provided and the file transfer process sends the local system a message "mail box empty" and, if the mail box is not empty, after receiving the data pertaining to the name of the desired report with the status report's exact location and print parameters, the file transfer process sends the local system said data concerning the status report to be retrieved.

17. A file transfer procedure according to claim 16, wherein the file transfer procedure further comprises:

a stop process used locally to interrupt one or more scans, and a stop message being written in the synchronization file of a specific scan for each of the scans to be interrupted.

18. A file transfer procedure according to claim 17, wherein the file transfer procedure further comprises:

a process for monitoring the automaton and for unblocking the local system in the event of a network problem; the process issuing locally, at each predetermined interval throughout the application of the procedure, a specific message stored in the synchronization file, the scan and command process receives said specific message, analyzes said specific message, and counts the number of times said specific message appears successively, the scan and command process detecting a network block, and the scan and command process is then automatically interrupted when only said message without other data is received a predetermined successive number of times.

* * * * *